(12) United States Patent
Leventhal et al.

(10) Patent No.: US 7,530,055 B1
(45) Date of Patent: *May 5, 2009

(54) MECHANISM FOR LOSSLESS USER-LEVEL TRACING ON AN X86 ARCHITECTURE

(75) Inventors: Adam H. Leventhal, San Francisco, CA (US); Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 858 days.

This patent is subject to a terminal disclaimer.

(21) Appl. No.: 10/824,450

(22) Filed: Apr. 14, 2004

(51) Int. Cl.
*G06F 9/44* (2006.01)

(52) U.S. Cl. .................. 717/128; 717/130; 717/134

(58) Field of Classification Search .......... 717/124–135
See application file for complete search history.

(56) References Cited

U.S. PATENT DOCUMENTS 6,295,644 B1 * 9/2001 Hsu et al. ............... 717/158
6,327,704 B1 * 12/2001 Mattson et al. ........... 717/153

OTHER PUBLICATIONS

Tamches, "Fine-grained dynamic instrumentation of commodity operating system", University of Wiscons, retrived from<http://citeseer.ist.psu.edu/cache/papers/cs/20969/http:zSzzSzwww.cs.wisc.eduzSzparadynzSzpaperszSztamches_thesis.pdf/tamches01finegrained.pdf>, pp. 1-154.*

Pierce et al., "IDtrace—A Tracing Tool for i486 Simulation", IEEE, @1994, retrieved from <google web site>, pp. 2.*

Bosch et al., "Complet x86 instruction trace generation from hardware bus collect", IEEE @ 1997, retrieved from <google web site>, pp. 402-408.*

Uhlig et al., "Trace-Driven Memory Simulation: A Survey", ACM vol. 29, No. 2, Jun. 1997, retrieved form <google web site>, pp. 1-43.*

Richard Moore, et al.; "IBM Dynamic Probes"; http://www-124.ibm.com/developerworks/opensource/linux/projects/dprobes/README, 2000.

* cited by examiner

*Primary Examiner*—Tuan Q Dam
*Assistant Examiner*—Marina Lee
(74) *Attorney, Agent, or Firm*—Osha • Liang LLP

(57) ABSTRACT

A method for tracing an instrumented program on a processor having an x86 architecture, including triggering a probe in the instrumented program, obtaining an original instruction associated with the probe, loading the original instruction into a scratch space, loading a jump instruction for the x86 architecture into the scratch space wherein the jump instruction includes a next program counter value, executing the original instruction in the scratch space using a thread, and executing the jump instruction in the scratch space using the thread.

10 Claims, 4 Drawing Sheets

MECHANISM FOR LOSSLESS USER-LEVEL TRACING ON AN X86 ARCHITECTURE

CROSS-REFERENCE TO RELATED APPLICATIONS

This application is related to U.S. Pat. No. 7,305,661 entitled "Mechanism For Lossless Tracing In An Architecture Having A Delay Slot" and U.S. Pat. No. 7,305,662 entitled "Mechanism For Lossless Tracing In An Arbitrary Context", which are hereby incorporated by reference.

BACKGROUND

Analyzing the dynamic behavior and performance of a complex software system is difficult. Typically, analysis of a software system is achieved by gathering data at each system call and post-processing the data. Data is gathered at each system call by placing a probe at locations of interest in the software (i.e., instrumenting the software to obtain an instrumented program) and gathering data when the probe is encountered by the thread executing the instrumented program.

Probes are typically represented in the instrumented code as trap instructions. The location (i.e., address) of each trap instruction is stored in a look-up table and associated with an original instruction (i.e., the instruction that is replaced when the program is instrumented).

When a thread executing the instrumented program encounters a trap instruction, control is transferred to a trap handler, which calls into the tracing framework and performs the actions associated with the trap instruction. The trap handler then looks up the original instruction in the look-up table. The trap instruction is then overwritten by the original instruction (i.e., the original instruction is placed back in its original location within the code path replacing the trap instruction that was just executed). The tracing framework then single-steps the original instruction (i.e., the original instruction is executed and then control is returned to the kernel). The original instruction in the code path is then overwritten by the trap instruction that was originally encountered by the thread. The thread then resumes executing the instrumented program. Using the single-stepping hardware of an x86 architecture, three context changes are required. One context change to return to the thread to execute the original instruction in single-step mode, another after the single stepping is completed (because a debug exception is executed in an x86 architecture after each single-stepped instruction), and a third to resume execution of the thread.

In a system in which more than one thread is executing within a given instrumented program, a particular thread may not trigger a probe (i.e., encounter a trap instruction) if the thread encounters the original instruction corresponding to a probe as opposed to the trap instruction. This situation typically occurs when a first thread encounters the trap instruction and overwrites it with a corresponding original instruction, and while this is occurring, a second thread encounters the original instruction. In this scenario, the first thread calls into the tracing framework to perform the actions associated with the trap instruction, while the second thread executes the original instruction but does not call into the tracing framework. The aforementioned method for instrumenting a program is typically referred to as "lossfull" (i.e., all the requested tracing information is not obtained because, in certain scenarios such as the one described above, a probe within a give code path may not be encountered by all executing threads).

Alternatively, the original instructions may be replaced with a reserved trap instruction, and when a thread executing the instrumented program encounters the reserved trap instruction, all threads executing in the instrumented program are suspended while the thread that caused the trap single-steps the original instruction, which is temporarily written over by the trap instruction, as defined above. Note that by suspending all the threads executing when the trap is encountered by one of the threads, the execution of the tracing framework is effectively serialized. After the thread has single-stepped the original instruction, the reserved trap instruction that was encountered by the thread is copied back over the original instruction in the code path. All threads executing in the instrumented program then resume executing the instrumented program. The aforementioned method for instrumenting a program is typically referred to as "lossless" (i.e., all the requested tracing information is obtained because the threads executing the instrumented program encounter all the probes in the code path in which they are executing).

SUMMARY

In general, in one aspect, the invention relates to a method for tracing an instrumented program on a processor having an x86 architecture, comprising triggering a probe in the instrumented program, obtaining an original instruction associated with the probe, loading the original instruction into a scratch space, loading a jump instruction for the x86 architecture into the scratch space wherein the jump instruction includes a next program counter value, executing the original instruction in the scratch space using a thread, and executing the jump instruction in the scratch space using the thread.

In general, in one aspect, the invention relates to a system for tracing an instrumented program on a processor having an x86 architecture, comprising a thread configured to execute the instrumented program, a look-up table arranged to store an address and a corresponding original instruction, a trap handler configured to halt execution of the thread when a trap instruction is encountered, use an address of the trap instruction to obtain the corresponding original instruction from the look-up table, and generate a jump instruction to an address in the instrumented program, a scratch space arranged to store the original instruction and the jump instruction; and an execution facility for executing the original instruction to collect data and executing the jump instruction, wherein the execution facility is a processor based on the x86 architecture.

Other aspects of the invention will be apparent from the following description and the appended claims.

DETAILED DESCRIPTION

Figure 1:
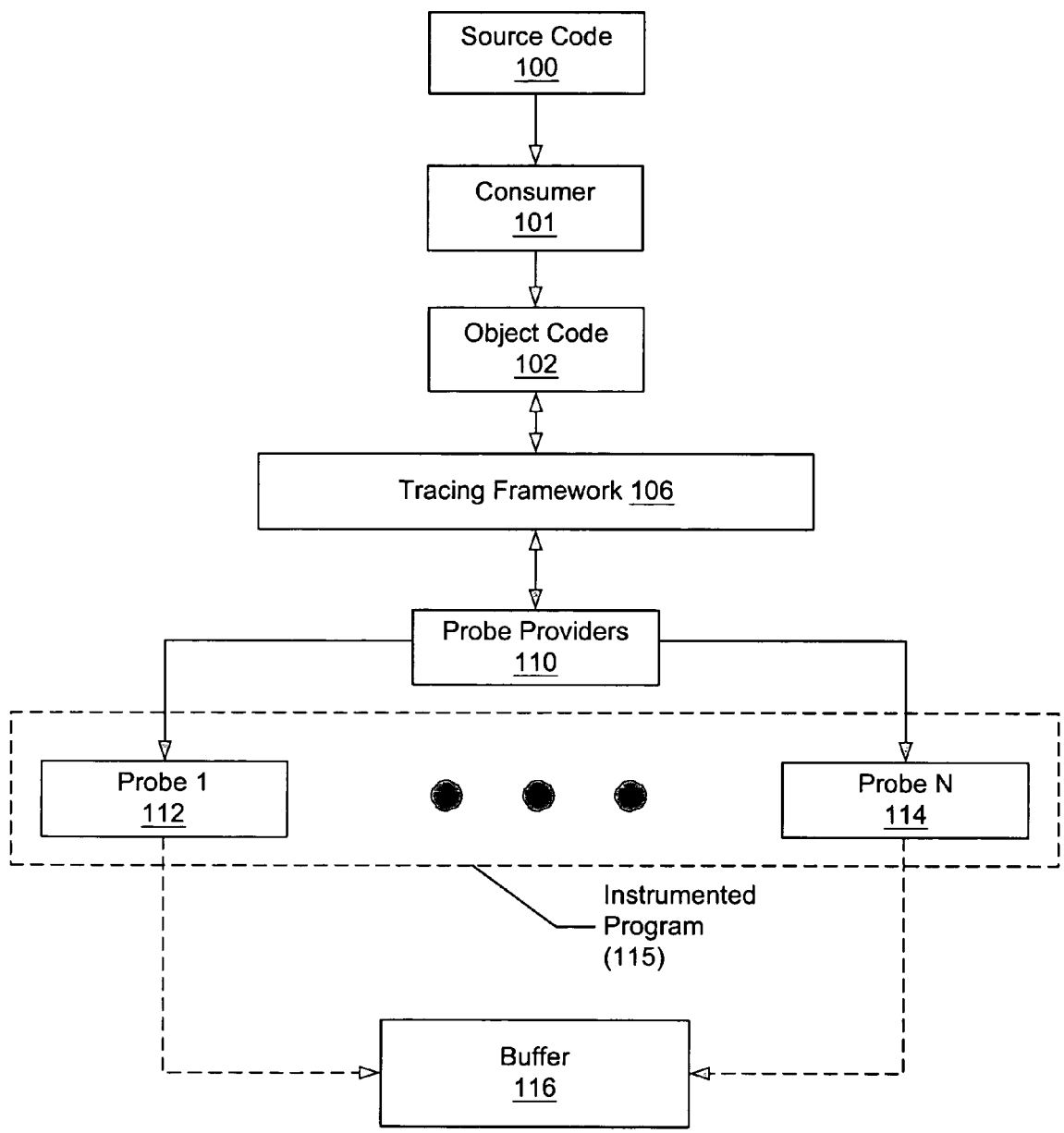
FIG. 1 shows a tracing framework architecture in accordance with an embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the invention relate to methods and apparatus for tracing an instrumented program. More specifically, one or more embodiments of the invention relate to lossless tracing of an instrumented program on an x86 processor architecture. x86 is the generic name of a standard architecture of microprocessors first developed and manufactured by Intel Corporation (Santa Clara, Calif.). Microprocessors based on this standard architecture are now manufactured by a number of other companies. In addition, many modern microprocessor architectures are backward compatible with the x86 architecture.

FIG. 1 shows a flow diagram detailing the collection of data in accordance with one embodiment of the invention. Specifically, FIG. 1 provides an overview of the process for collecting data for a buffer (116). Initially, source code (100) is written/obtained/generated that defines a tracing function (i.e., a request to obtain certain data). More specifically, the tracing function defines which probes (112, 114) to enable within the instrumented program (115), and what actions the tracing framework (106) is to perform when the probes (112, 114) are triggered (i.e., when a thread executing the instrumented program (115) encounters the probes (112, 114)). In one or more embodiments of the invention, a tracing function may define one or more actions that the tracing framework (106) is to perform when the probes (112, 114) is encountered.

The source code (100) is typically associated with a consumer (101). Note that a consumer (101) may define one or more tracing functions. The consumer (101) is a virtual client that sends requests, in the form of tracing functions, to the tracing framework (106) to obtain information about the instrumented program (115). Further, the consumer (101) also retrieves the requested information, which is stored by the tracing framework (106) in the associated buffer (116).

The source code (100) is subsequently forwarded, via the consumer (101) to a compiler (not shown), where the source code (100) is compiled to generate executable object code (102). The object code (102) is then communicated to a tracing framework (106). The tracing framework (106) includes functionality to execute the object code (102). Specifically, the tracing framework (106) interprets the object code (102) and directs the probe providers (110) to activate certain probes (112, 114) within the instrumented program (115).

The probes (112, 114) gather the specified information from the instrumented program (115), as defined by the object code (102) derived from the actions defined within the source code (100), and forward the information (directly or indirectly) to a corresponding buffer (116).

In one or more embodiments of the invention, each probe (112, 114) in the instrumented program (115) is represented by a trap instruction. The address corresponding to location of the trap instruction within the instrumented program (115) is recorded in a look-up table along with the original instruction (i.e., the particular instruction that the consumer would like to execute to obtain data). In one embodiment of the invention, the original instruction corresponds to an action that is to be performed when the probe (112, 114) is encountered. The action, as noted above, is typically defined by the consumer (101). In one embodiment of the invention, representing each probe as a trap instruction and generating a corresponding look-up table may be performed by the tracing framework (106).

Prior to the collection of tracing information, one or more probes (112, 114) are activated per a consumer (101) request. The activation of a probe, in accordance with one embodiment of the invention, also includes replacing the original instruction in the instrumented program (115) with a trap instruction, storing the address of the trap instruction and the associated original instruction in a look-up table. In one embodiment of the invention, the scratch space is allocated each time a thread is created.

Figure 2:
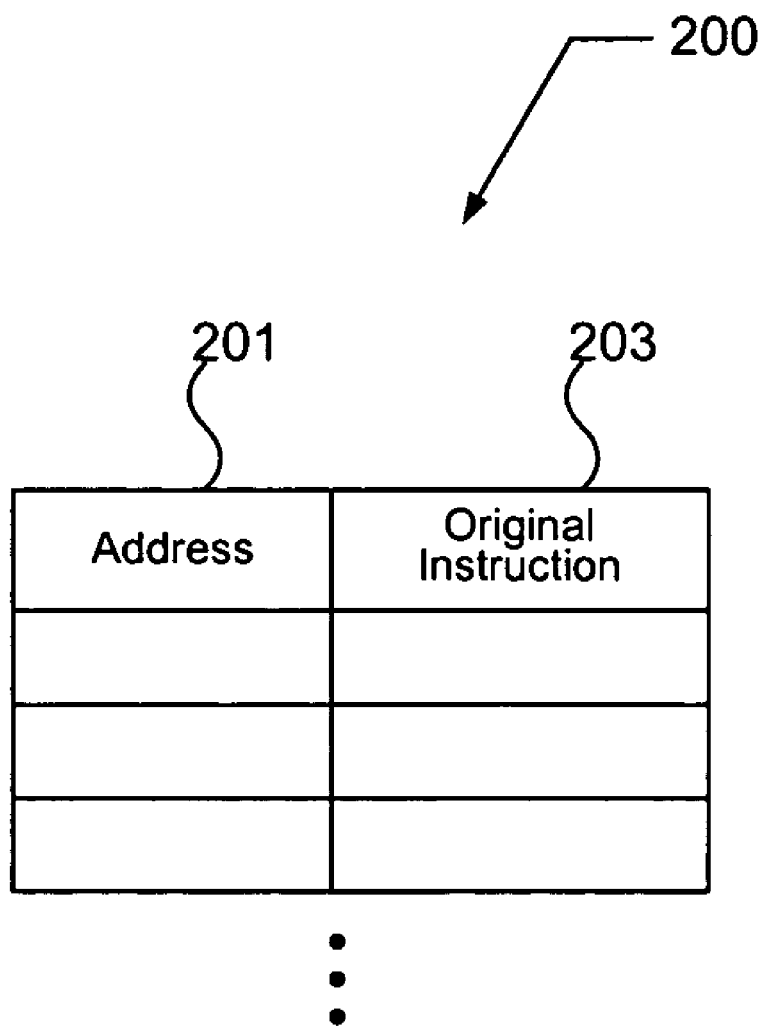
FIG. 2 shows a look-up table layout in accordance with one embodiment of the invention.

FIG. 2 shows a look-up table layout in accordance with one embodiment of the invention. As shown in FIG. 2, the look-up table (200) includes one or more entries each of which may include an address field (201) storing the address of the trap instruction within the instrumented program (115) and an original instruction field (203) storing the original instruction. The look-up table (200) may also store additional ancillary information needed to specify the address.

Figure 3:
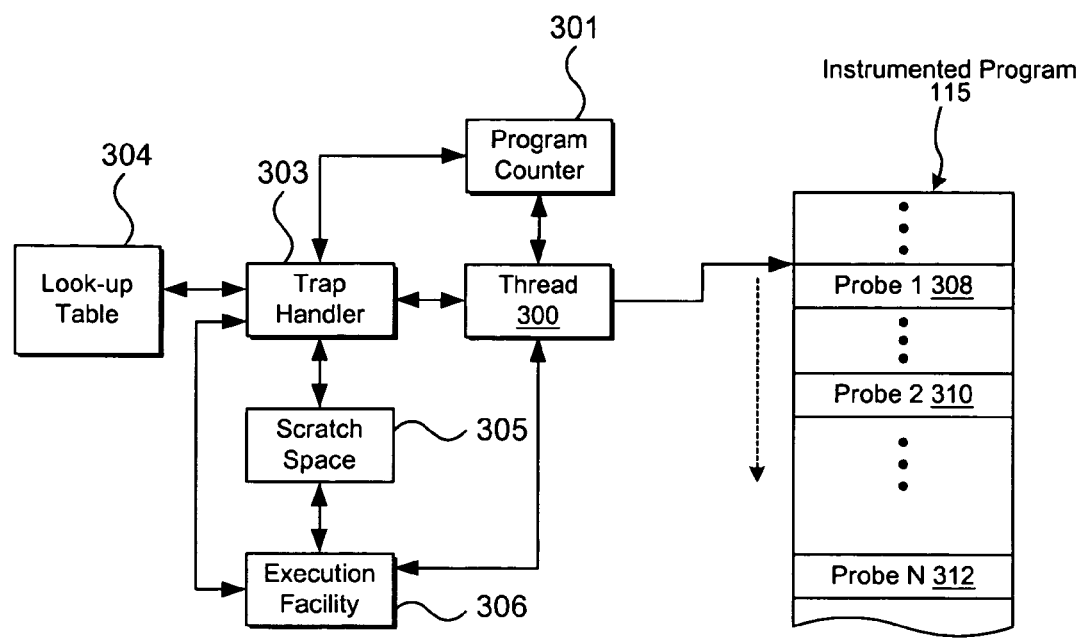
FIG. 3 shows a flow diagram in accordance with one embodiment of the invention.

FIG. 3 shows a flow diagram in accordance with one embodiment of the invention. More specifically, FIG. 3 shows a flow diagram detailing the mechanism for collecting data using a probe in accordance with one embodiment of the invention. Each component in FIG. 3 may be implemented by one or more software modules, hardware components, or any combination thereof. Further, each component shown in FIG. 3 may be distributed across one or more processors.

In FIG. 3, a program counter (301) stores a value corresponding to a current address of a thread (300) executing in the instrumented program (115). When a probe (308, 310, 312), represented by a trap instruction, is encountered by the thread (300), the thread (300) transfers control to a trap handler (303). More specifically, when a probe (308, 310, 312) is encountered, a trap is triggered which is subsequently handled by the trap handler (303). The trap handler (303) searches the look-up table (304), using the program counter (301) value, to obtain the original instruction associated with the probe (308, 310, 312). In addition, the trap handler (303) calls into the tracing framework (106) to perform actions associated with the trap instruction. Those skilled in the art will appreciate that various machine architectures may require additional information, aside from the program counter, to generate an address that may then be used to obtain the original instruction. In this embodiment, the trap handler (303) includes functionality to obtain such information.

The original instruction is evaluated to determine whether the instruction is a control-flow instruction (i.e., an instruction that affects the value of the program counter). Examples of the control-flow instructions include a branch instruction, a function call, explicit reading of the program counter itself, etc. If the original instruction is not a control-flow instruction, the original instruction is loaded into a corresponding scratch space (305). The scratch space (305) is typically a small address range or allocation of an address space that is used to temporarily store the original instruction. In one or more embodiments of the invention, the scratch space resides outside the kernel. In one embodiment of the invention, the scratch space is allocated each time a thread is created. If the system upon which the tracing framework (106) executes supports multiple threads in a process, then the scratch space (305) is allocated on a per-thread basis. In one or more embodiments of the invention, the trap instruction is no larger than the size of the smallest original instruction that is to be replaced.

Continuing with the discussion of FIG. 3, after loading the original instruction, the trap handler (303) generates and loads a jump instruction, specifically an x86 jmp instruction, into the scratch space (305). An x86 jmp instruction transfers program control to a different point in the instruction stream without recording return information, thus not affecting any system state other than the program counter. The loaded jump instruction includes the next program counter value as the destination address (i.e., points the thread to the next instruction in the instrumented program to execute). The next program counter value may be obtained by simply adding the size of the original instruction to the current value of the program counter if the original instruction is not a control-flow instruction.

The trap handler (303) sets the program counter to point to the original instruction in the scratch space (305) and control is returned to the thread (300). The execution facility (306) executes the original instruction in the scratch space (305) and then executes the jump instruction. In one embodiment of the invention, the execution facility (306) is a processor with an x86 architecture or an architecture that is backward compatible with an x86 architecture. The execution of the jump instruction transfers program control out of the scratch space (305) and back to the next instruction in the instrumented program.

In one embodiment of the invention, if the original instruction is a control-flow instruction, then the instruction is emulated in software. The program counter as well as any other state in the system that would be modified by the native execution of the original instruction is updated based on the results of the emulation. The trap handler then returns control to the thread (300) at the location indicated by the program counter after the emulation is completed.

Figure 4:
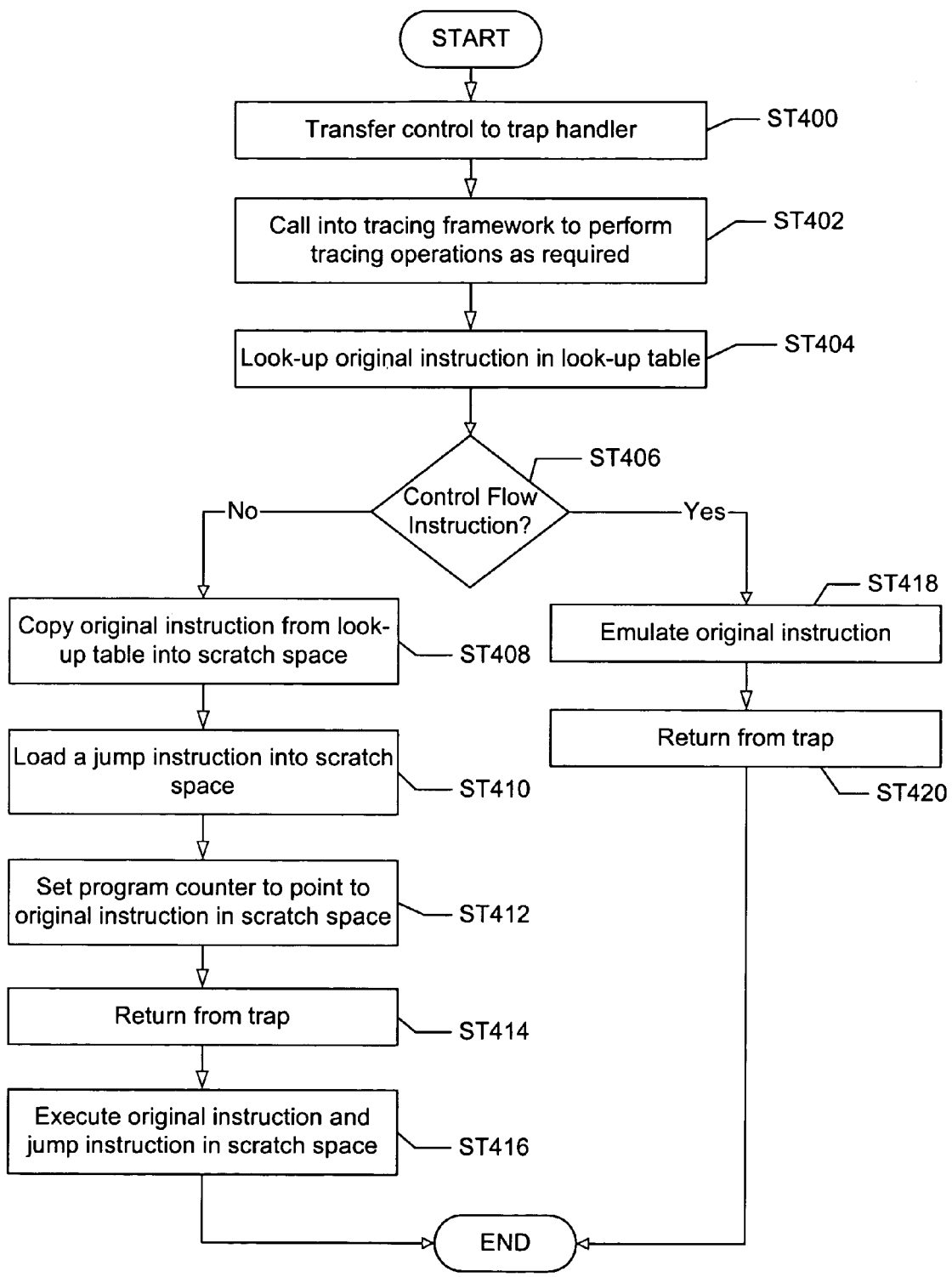
FIG. 4 shows a flowchart in accordance with one embodiment of the invention.

FIG. 4 shows a flowchart detailing the steps that occur when a probe (e.g., a trap instruction corresponding to a probe) is encountered by a thread executing the instrumented program in accordance with one embodiment of the invention. When a thread executing the instruction is encountered, the thread executing the trap instruction transfers control to an appropriate trap handler (Step 400). The trap handler calls into the tracing framework to perform tracing operations as required (Step 402). In one or more embodiments of the invention, the tracing framework performs a tracing operation and generates corresponding tracing information. The tracing information may include, but is not limited to, an argument, a pointer value, a name of a system call, etc. In addition, the tracing operation may correspond to consumer-specified actions that the tracing framework is to perform when the particular trap instruction is encountered.

Continuing with FIG. 4, after the trap handler has made the appropriate calls into the tracing framework, the trap handler queries the original instruction in the look-up table using the location of the trap instruction (and additional information as required) (Step 404). The original instruction is evaluated to determine whether the instruction is a control-flow instruction (Step 406). If the original instruction is not a control-flow instruction, then the original instruction is copied into a scratch space (which may be allocated on a per-thread basis) (Step 408). The trap handler then places a jump instruction in the scratch space (Step 410). The jump instruction includes the next program counter value (i.e., points the thread to the next instruction in the instrumented program to execute). The next program counter value may be obtained by simply adding the size of the original instruction to the current value of the program counter.

Once the original instruction and the jump instruction, i.e., an x86 jmp instruction, have been loaded into the scratch space, the program counter is updated to point to the original instruction in scratch memory (Step 412). Control is returned to the thread that initially executed the trap instruction (Step 414) whereupon the execution facility executes the original instruction and the jump instruction (Step 416). Thus, once the original instruction has been executed, the jump instruction is executed, transferring program control out of the scratch space and back to the next instruction in the instrumented program. One skilled in the art can appreciate that Step 416 is typically performed at user level, while the other steps shown in FIG. 4 are typically performed at the kernel level.

If the original instruction is a control-flow instruction (Step 406), the instruction is emulated in software (Step 418). The program counter as well as any other state in the system that would be modified by the native execution of the original instruction is updated based on the results of the emulation and control. The trap handler then returns control to the thread at the location indicated by the program counter upon completion of the emulation (Step 420).

One or more embodiments of the invention provide an efficient means for collecting information about an instrumented program. Specifically, embodiments of the invention provide a manner to collect tracing information in multi-thread environment executing on an x86 architecture without losing tracing information. Embodiments of the invention also provide a manner for executing the original instruction replaced by a trap instruction without requiring that the original instruction be single-stepped using the hardware support provided in an x86 architecture. Further, only a single context switch (or control transfer) is required to resume execution of the thread while tracing an instrumented program.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for tracing an instrumented program on a processor having an x86 architecture, comprising:
    triggering a probe in the instrumented program;
    obtaining an original instruction associated with the probe, wherein obtaining the original instruction comprises searching a look-up table using a program counter value, wherein the look-up table comprises the original instruction associated with the probe and an address associated with the original instruction, and wherein the program counter value corresponds to a current address of a first thread executing in the instrumented program;
    allocating a second scratch space for a second thread;
    loading the original instruction into the second scratch space, wherein the scratch space is allocated on a per-thread basis, and wherein a first scratch space for the first thread executing in the instrumented program was previously allocated;
    loading a jump instruction for the x86 architecture into the second scratch space wherein the jump instruction includes a next program counter value;
    executing the original instruction in the second scratch space using the second thread to collect data; and
    executing the jump instruction in the second scratch space using the second thread.

2. The method of claim 1, further comprising:
    emulating the original instruction to determine the program counter value if the original instruction is a control-flow instruction; and returning control to the second thread at an address of the program counter value if the original instruction is the control-flow instruction.

3. The method of claim 1, further comprising:

determining the next program counter value by incrementing the program counter value using a size of the original instruction.

4. The method of claim 1, wherein the probe corresponds to a trap.

5. The method of claim 1, wherein the instrumented program is executed on a multi-thread architecture.

6. A system for tracing an instrumented program on a processor having an x86 architecture, comprising:

a first thread configured to execute the instrumented program;

a second thread configured to execute the instrumented program;

a first scratch space allocated for the first thread;

a program counter value corresponding to a current address of the first thread;

a look-up table arranged to store an address and a corresponding original instruction;

a trap handler configured to halt execution of the second thread when a trap instruction corresponding to a probe is encountered, use the program counter value to obtain the corresponding original instruction from the look-up table, and load a jump instruction into a second scratch space, wherein the jump instruction includes a next program counter value;

the second scratch space arranged to store the original instruction and the jump instruction, wherein the second scratch space is allocated on a per-thread basis, and wherein the first scratch space for the first thread executing in the instrumented program was previously allocated; and an execution facility for executing the original instruction in the second scratch space to collect data and executing the jump instruction, wherein the execution facility is a processor based on the x86 architecture.

7. The system of claim 6, further comprising:

a buffer for storing the data.

8. The system of claim 6, further comprising:

a tracing framework configured to emulate the original instruction to determine a value of the program counter if the original instruction is a control-flow instruction and to return control to a thread at an address of the program counter value if the original instruction is the control-flow instruction.

9. The system to claim 6, wherein the trap handler sets a destination of the jump instruction to a next address immediately following an address of the trap instruction.

10. The system of claim 6, wherein the instrumented program is executed on multi-thread architecture.

\* \* \* \* \*